W. A. SCHILLER.
SHOCK ABSORBER.
APPLICATION FILED JUNE 1, 1911.
1,006,686.
Patented Oct. 24, 1911.
2 SHEETS—SHEET 2.
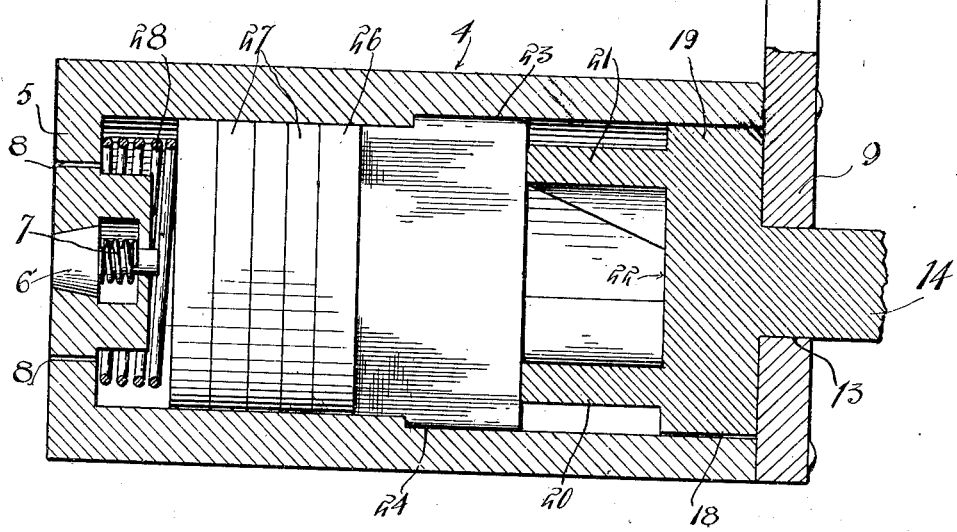
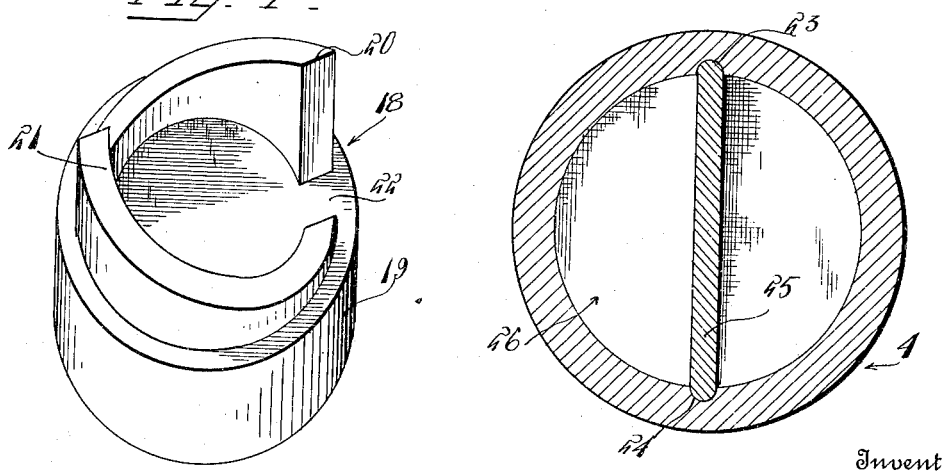
Witnesses
Inventor
W. A. Schiller.
By
Attorney

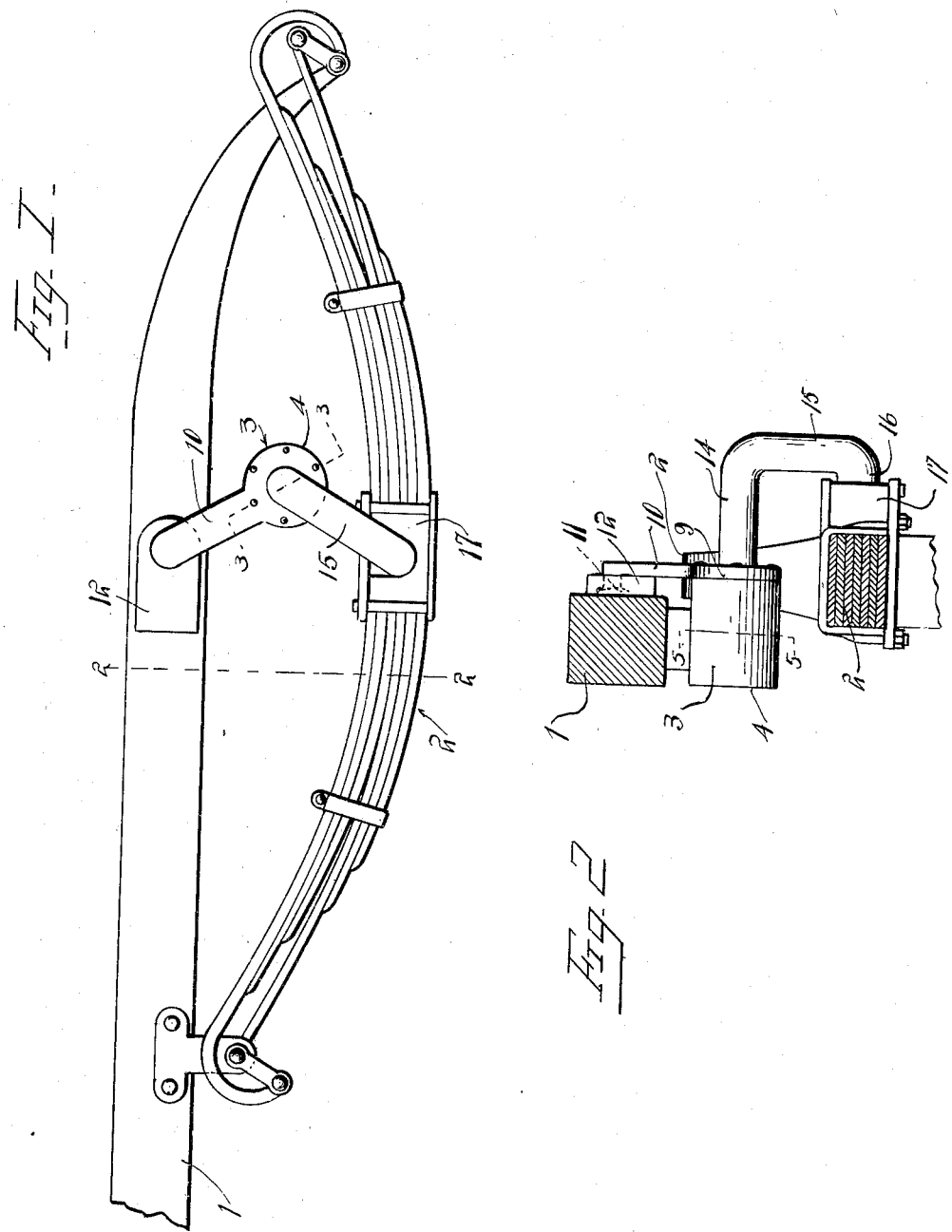

UNITED STATES PATENT OFFICE.

WILLIAM A. SCHILLER, OF GOODISON, MICHIGAN.

SHOCK-ABSORBER.

1,006,686. Specification of Letters Patent. Patented Oct. 24, 1911.

Application filed June 1, 1911. Serial No. 630,642.

*To all whom it may concern:*

Be it known that I, WILLIAM A. SCHILLER, a citizen of the United States, residing at Goodison, in the county of Oakland, State of Michigan, have invented certain new and useful Improvements in Shock-Absorbers; and I do hereby declare the following to be a full, clear, and exact description of the invention, such as will enable others skilled in the art to which it appertains to make and use the same.

My invention relates to new and useful improvements in shock absorbers and the object of my invention is to provide shock absorbers for use in connection with vehicles, which will coöperate with the springs thereof.

A further object of my invention is to provide a shock absorber which will remain inactive while the springs are being compressed, but which will operate during the expansion of the springs to limit the upward movement of the body of the vehicle.

With these and other objects in view my invention will be more fully described, illustrated in the accompanying drawings which show a preferred embodiment of my shock absorber and then specifically pointed out in the claim which is attached to and forms a part of this application.

In the accompanying drawings, Figure 1 is a side elevation of the absorber as applied to the frame of the motor vehicle. Fig. 2 is an end elevation, the frame and springs being shown in section on the line 2—2 of Fig. 1. Fig. 3 is a section on the line 3—3 of Fig. 1. Fig. 4 is a perspective of the operating cams. Fig. 5 is a section on the line 5—5 of Fig. 2.

Referring more specifically to the drawings in which similar reference numerals designate corresponding parts throughout, 1 designates the frame of the vehicle to which is secured the conventional form of spring 2.

My shock absorber, which as a whole is designated by the numeral 3 is adapted to be positioned between the frame and spring, as shown, and to limit the expansion of the spring after its distortion, thus limiting the upward movement of the vehicle.

The shock absorber 3 consists of a metallic cylinder 4, having a closed end 5 provided with a suitable form of air intake valve 6 which is normally maintained in closed position by means of a light helical spring 7. This closed end of the cylinder is also provided with one or more ports 8 which permit escape of air from the cylinder. The other end of the cylinder is provided with a closure 9 formed with an extending arm 10, the free end of which is provided with a lateral extension 11 which is rotatably journaled in suitable bearings 12 carried by the frame. This closure 9 is provided with a centrally located bore 13, in which is rotatably mounted a lateral extension 14 of a lever arm 15, the other end of which is provided with a second lateral extension 16 which is journaled in suitable bearings 17 carried by the spring, said bearings being preferably located at a point directly below the bearings 12. The inner end of the extension 14 is provided with a cam member 18 which is best shown in Fig. 4 of the drawings consists of a disk shaped plate 19 the diameter of which is slightly less than the inner diameter of the cylinder, and formed integrally with said plate and extending from its inner face are the oppositely disposed, concentric, wedge cam members 20 and 21, the adjacent ends of which are slightly spaced apart as shown at 22. The inner face of the cylinder 4 is provided with a pair of diametrically oppositely disposed, longitudinal grooves 23 and 24 and reciprocally mounted in the cylinder with its edges seated in these grooves is a plunger plate 25, which as shown in Fig. 5 of the drawings, is of such thickness that it may be seated with its end positioned between the adjacent ends of the cams 20 and 21.

Reciprocally mounted in the cylinder 4 and between the plunger plate and the closed end 5 of the cylinder is a piston 26, provided with customary packing rings 27 forming an air tight engagement with the walls of the cylinder. This piston is maintained in engagement with the plunger plate by means of the helical spring 28 one end of which bears against the piston while its other end bears against the closed end 5 of the cylinder.

The cams 20 and 21 are so positioned upon the cam member proper that when the spring 2 is in normal position the plunger plate 25 will be positioned to bear upon the cams intermediate their length.

From the foregoing description, the operation of my shock absorber is apparent. As the spring 2 is compressed the device operates as a hinge, the arms 10 and 11 moving toward each other in such a manner as to allow the plunger plate to move down the inclined faces of the cams, thereby allowing the piston to move away from the closed end 5 of the cylinder thus letting in air through the valve 6. As will be seen the device in no way-affects the action of the springs while the same are being compressed. As the springs expand the arms are rotated in the opposite direction by which means through the medium of the cams, the plunger plate is forced against the piston, forcing it toward the closed end 5 of the cylinder, the air slowly escaping meanwhile through the ports 8. By this means an air cushion is formed in the closed end of the cylinder, which tends to retard the expansion of the springs and also to prevent them from becoming unduly expanded. As will be readily understood this regulating of the spring expansion will obviate to a great extent all undue motion of the body of the vehicle which is ordinarily caused by the springs when the vehicle is traveling over rough roads or at a high rate of speed.

What I claim is:—

In a shock absorber, the combination with a vehicle frame and a spring therefor, provided at one end with an air inlet valve and escape ports, a closure for the other end of said cylinder, said closure having an extending arm the free end of which terminates in a lateral extension journaled in the frame, a spring held piston slidable in said cylinder, a plunger plate mounted against rotation in said cylinder and slidable therein, one end of said plunger bearing against the piston, a disk shaped cam member rotatably mounted in said cylinder and having wedge cams adapted to engage with the free end of said plunger plate and actuate the same when the cam member is rotated, and means connecting said cam member with the spring of the frame, said means being adapted to rotate the cam member when said frame spring is distorted.

In testimony whereof, I affix my signature, in presence of two witnesses.

WILLIAM A. SCHILLER.

Witnesses:
JOSEPH A. SCHILLER,
L. N. BARR.